(12) United States Patent
Terajima

(10) Patent No.: US 6,301,015 B1
(45) Date of Patent: Oct. 9, 2001

(54) IMAGE PRINTING APPARATUS AND MONITOR DISPLAY DENSITY SETTING METHOD

(75) Inventor: Akirou Terajima, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 08/845,039

(22) Filed: Apr. 21, 1997

(30) Foreign Application Priority Data

Apr. 22, 1996 (JP) ..................................................... 8-100503

(51) Int. Cl.[7] .............................. B41B 15/00; H04N 1/21; H04N 1/40; G03F 3/08
(52) U.S. Cl. ........................... 358/1.9; 358/298; 358/456; 358/523
(58) Field of Search ..................................... 395/109, 131; 358/456, 298, 523, 462, 464, 524, 1.9; 382/239, 166; 355/38, 32, 77

(56) References Cited

U.S. PATENT DOCUMENTS

| | | | |
|---|---|---|---|
| 5,264,946 | * 11/1993 | Takakura et al. | 358/466 |
| 5,303,071 | * 4/1994 | Kakimura | 358/519 |
| 5,333,243 | * 7/1994 | Best et al. | 395/109 |
| 5,528,377 | * 6/1996 | Hutcheson | 358/298 |
| 5,619,742 | * 4/1997 | Matsumoto et al. | 396/569 |
| 5,987,220 | * 11/1999 | Terajima et al. | 358/1.9 |

* cited by examiner

Primary Examiner—Edward Coles
Assistant Examiner—Twyler Lamb
(74) Attorney, Agent, or Firm—Sughrue, Mion, Zinn, Macpeak & Seas, PLLC

(57) ABSTRACT

An apparatus for printing images recorded on photosensitive film to a printing paper is disclosed. The apparatus exposes the image, displays the image on a monitor before printing, and adjusts the image to be printed. A reference image is read by a scanner to obtain a digital image data, a predetermined number of digital pixel data for each color of the gray component from the digital image data are extracted, and, on the basis of a predetermined number of the extracted digital pixel data for each color of the gray component, the monitor is adjusted according to a predetermined quantitative condition for substantially equalizing the appearance of the image on the monitor and an image to be printed. Accordingly, the variations due to different sensory perceptions among operators are eliminated and quick adjustment is enabled.

7 Claims, 8 Drawing Sheets

IMAGE PRINTING APPARATUS AND MONITOR DISPLAY DENSITY SETTING METHOD

BACKGROUND OF THE INVENTION

1. Field of the Invention

The present invention relates to an image printing apparatus, or more specifically to an image printing apparatus for projecting and printing images recorded on a photographic film and a method of setting the monitor display density.

2. Description of the Related Art

In conventional image printing apparatus for printing images recorded on a photographic film on to printing paper, the image to be printed is displayed on the monitor included in the image printing apparatus and the operator adjusts the exposure condition, etc. by visually checking the image.

In this image printing apparatus, an image displayed on the monitor and an image to be actually printed on the printing paper are required to be adjusted in advance to present the same appearance (to the human eye) using a reference negative image prepared for each predetermined density. As a reference negative image, what is called a Bull's eye with a gray image 601 recorded for each predetermined density as shown in FIG. 8 is used. The Bull's eye generally has four types according to density. They are an under negative film (hereinafter called the U Bull's eye), a normal negative film (hereinafter called the N Bull's eye), an over negative film (hereinafter called the O Bull's eye) and an over-over negative film (hereinafter called the Oo Bull's eye). A figure image 602 such as shown by dotted line in FIG. 8 may be recorded on the image frame 600 of the Bull's eye. This is referenced for adjustment taking the skin color into consideration.

An index print separate from the main print can be prepared using the image data displayed on the monitor. This index print includes a matrix of frames arranged so that the photographs on the developed film may be easily checked. In an index printer capable of producing such an index print, a liquid crystal panel is used as an image display means, on which the image data corresponding to a plurality of image frames recorded on the photographic film are displayed and are printed at the same time on the printing paper as an image smaller than a normal print.

The image displayed on the monitor, i.e., the image used for the index print depends on the operator's skill for the adjustment thereof, therefore, having the disadvantage of causing considerable variations in adjustment depending on the sense of the individual operators and depending on which portion of the Bull's eye image is attentively observed by the operator, and that quick adjustment is difficult.

SUMMARY OF THE INVENTION

The present invention has been developed in view of the above-mentioned facts. The object of the present invention is to provide an image printing apparatus and a monitor display density setting method in which a simulator for simulating the recording of an image on a photosensitive material can easily adjust the gray for monitor display and can print a proper image.

According to the first aspect of the present invention, there is provided an image printing apparatus for exposing an image recorded on a photographic film and printing the image in a predetermined printing area on the photosensitive material, the apparatus comprising a simulator including a scanner for reading the image, producing a digital image data, and displaying an image based on the digital image data on a monitor, wherein the simulator has a reference image signal processing mode for reading a reference image by the scanner, extracting a predetermined number of digital pixel data for each color of the gray component from the read reference image and displaying the digital pixel data on the monitor.

In the first aspect, a predetermined number of digital pixel data on the gray component of the reference image read by the scanner is displayed on the monitor in terms of a numerical value (quantitatively), for example. Consequently, by reference to the pixel data displayed on the monitor, the operator can quantitatively adjust the appearance on the display section. In this way, the variations due to different sensory perceptions among individual persons can be eliminated and even the operator with little experience can make adjustment quickly.

According to the second aspect of the present invention, there is provided an image printing apparatus, wherein, in the first aspect, a plurality of digital pixel data are extracted for each color of the gray component from a reference image read by the scanner, and the average value of the digital pixel data is displayed on the monitor for each color, in the reference image signal processing mode.

In the second aspect, only the average value of a plurality of digital pixel data on the gray component of the reference image read by the scanner is displayed on the monitor. Therefore, as compared with the case in which the digital pixel data on a single pixel is displayed, it is possible to obtain a stable digital pixel data hardly affected by the scar, smear or the like on the reference image, with the result that the appearance on the monitor can be accurately adjusted. Also, as compared with the case in which a plurality of digital pixel data are all displayed at once, the digital pixel data can be checked at a glance. As a result, the appearance on the monitor can be adjusted more quickly.

According to the third aspect of the present invention, there is provided a monitor display density setting method used with an image printing apparatus for exposing an image recorded on a photographic film, displaying the image on a monitor before printing it in a predetermined printing area on a photosensitive material, and adjusting the image to be printed, the method comprising the steps of reading a reference by a scanner to obtain a digital image data, extracting a predetermined number of digital pixel data for each color of the gray component from the digital image data, and, on the basis of the predetermined number of extracted digital pixel data for each color of the gray component, adjusting the monitor according to the predetermined quantitative condition for substantially equalizing the appearance of the image on the monitor.

According to the third aspect, the data for substantially equalizing the image on the monitor and an image to be printed is quantitatively presented on the basis of a predetermined number of digital pixel data of the gray component of a reference image read by the scanner. The quantitative presentation is defined as displaying a numerical value or the like on the monitor and causing the operator to make adjustment on the basis of the numerical value or as making it possible to set an automatically adjustable numerical value or the like in a control program. This quantitative presentation eliminates the variations due to the different senses of different operators and makes possible the speed-up of the adjustment at the same time.

According to the fourth aspect of the present invention, there is provided a monitor display density setting method, wherein, in the third aspect, the digital image data of the reference image read by the scanner is displayed on the monitor.

In the fourth aspect, the digital image data of a reference image read by the scanner is displayed on the monitor. Consequently, the legitimacy of the result obtained by the monitor display density setting method according to the third aspect can be determined visually by the operator.

According to the fifth aspect of the present invention, there is provided a monitor display density setting method, wherein, in the third or fourth aspect, a predetermined number of the digital pixel data for each color of the gray component extracted is displayed on the monitor.

In the fifth aspect, the digital pixel data for each color of the gray component is displayed on the monitor. Therefore, the operator can visually determine whether the digital pixel data is set in a predetermined range where the appearance is substantially the same between the image on the monitor and an image to be printed.

DESCRIPTION OF THE PREFERRED EMBODIMENTS

Embodiments of the present invention will be described below with reference to the drawings.

First Embodiment

Figure 1:
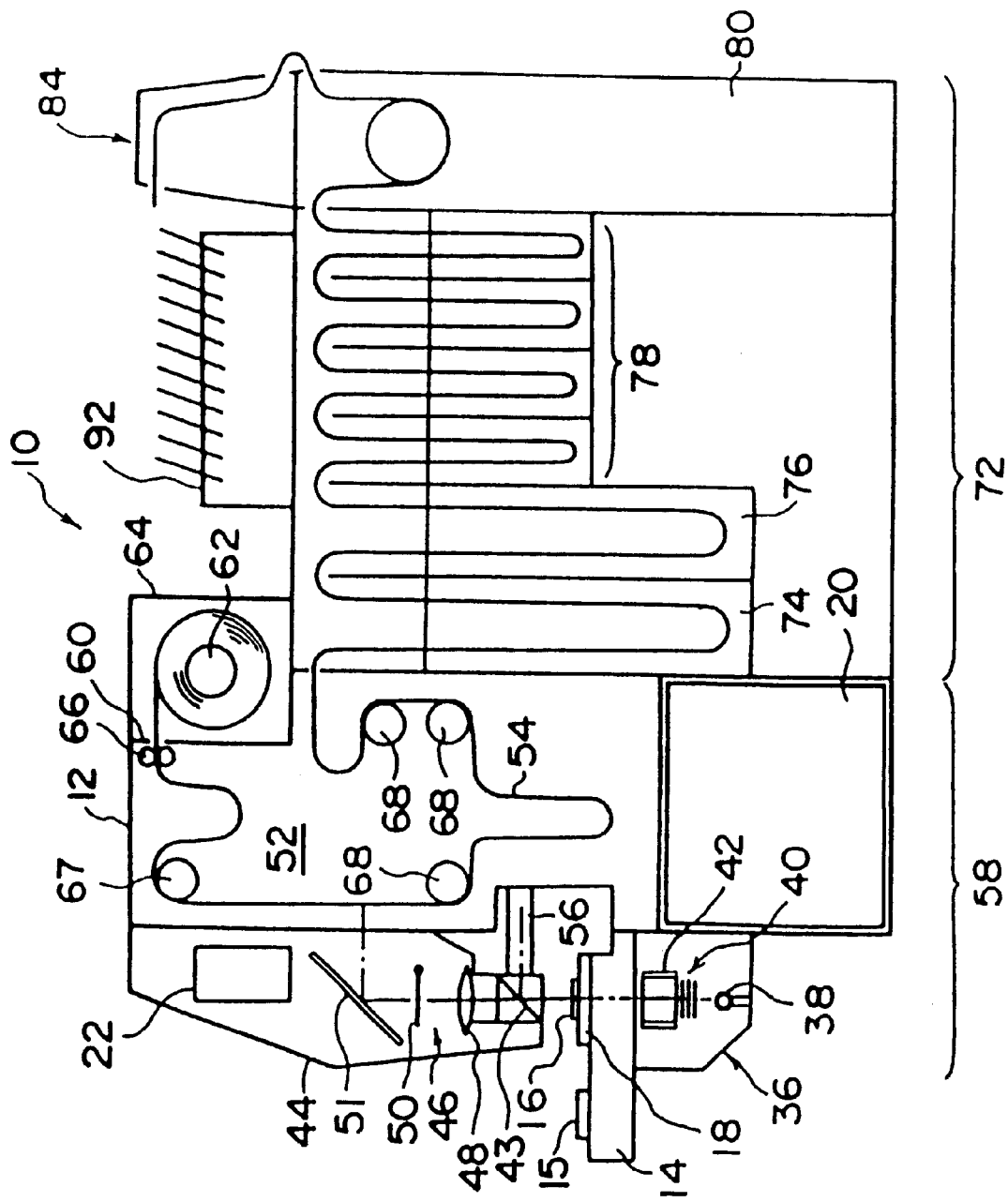
FIG. 1 is a schematic diagram illustrating a configuration of the printer processor according to an embodiment of the present invention.

As shown in FIG. 1, a printer processor 10 is covered by a casing 12, and includes a printer section 58 for exposing the printing papers of the main print and the subsidiary print and a processor section 72 for performing processes such as developing, fixing, washing and drying of the exposed printing paper.

The printer section 58 is provided with a work table 14 protruding from the casing 12 (leftward in FIG. 1). A negative carrier 18 on which a negative film 16 is set and a keyboard 15 with which the operator enters commands and data are disposed on the upper surface of the work table 14.

A main exposure light source 36 is installed under the work table 14. The main exposure light source 36 includes a light source 38. A color correction filter (hereinafter called the CC filter) 40 and a diffusion cylinder 42 are disposed in that order so that the light emitted from the light source 38 is irradiated on a negative film 16 set on the negative carrier 18 located on the work table 14. The CC filter 40 is configured of C (cyan), M (magenta) and Y (yellow) filters. Each filter works under the control of a CC filter controller 39 (FIG. 2) and is adapted to emerge on and submerge from the optical axis of the light emitted from the light source 38.

An arm 44 is arranged above (upper side in FIG. 1) the negative carrier 18. A main exposure optical system 46 and the subsidiary print section 22 for exposing a subsidiary print such as an index print are installed in the arm 44.

The main exposure optical system 46 comprises a half mirror 43, an exposure lens 48 for changing the exposure magnification, a black shutter 50 and a mirror 51 in that order from the light emission side of the negative film. A negative image is thus formed on the printing paper 54 set in an exposure chamber 52.

A mounting section 60 is provided at the corner between the upper right side of the arm 44 and the upper side of the casing 12. A paper magazine 64 for accommodating the printing paper 54 in rolled layers on a reel 62 is loaded in the mounting section 60. A roller pair 66 is disposed in the vicinity of the mounting section 60 for holding and conveying the printing paper 54 in a horizontal position to the exposure chamber 52.

In the exposure chamber 52 are also disposed rollers 67, 68. The printing paper 54 which has been printed with an image of the negative film 16 is conveyed by the rollers 66, 67, 68, respectively, in the exposure chamber 52 to a processor section 72 described later.

The processor section 72 includes a coloring development bath 74 for storing a coloring development solution, a bleach-fix bath 76 for storing a bleaching-fixing solution and a plurality of rinse baths 78 for storing a washing solution. The printing paper 54 is developed, fixed and washed as it passes through the baths sequentially. The printing paper 54 thus washed is dried in a drying section 80 adjacent to the rinse bath 78.

The printing paper 54 is held between a pair of rollers not shown, and after being completely dried, is delivered at a fixed rate from the drying section 80. A cutter section 84 is provided downstream of the drying section 80. The printing paper 54 is cut into image frames by a cutter not shown and delivered to a sorter section 92. The sorter section 92 sort and inspect the image frames in a predetermined manner. This inspection work picks out substandard prints such as what is called out-of-focus prints, and then normal photographic prints are returned to the customer together with the negative film.

Figure 2:
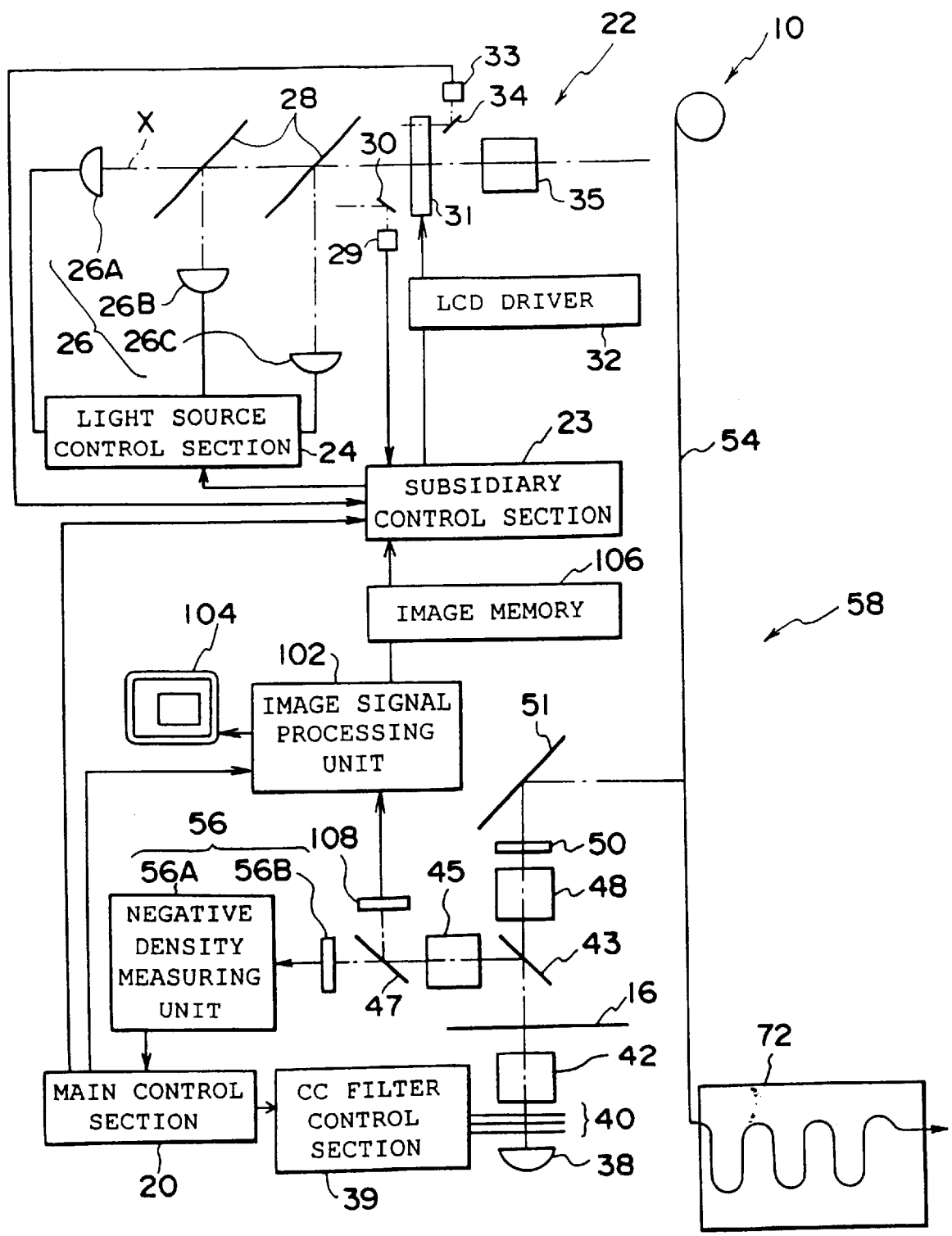
FIG. 2 is a block diagram illustrating a configuration of the printer section of the printer processor.

As shown in FIG. 2, a photometeric lens 45 for changing the magnification of the photometric image and a half mirror 47 are disposed in that order downstream of the path of the light reflected from a half mirror 43. The photometric lens 45 is fixed at a predetermined magnification according to this embodiment.

A scanner 108 including an image sensor or the like is disposed in the direction in which the light is reflected from the half mirror 47. The scanner 108 is connected to an image signal processing unit 102 for performing a predetermined image processing on the image data of each frame of the negative film 16 read by the scanner 108.

The image signal processing unit 102 is connected to a monitor 104. A print simulation image prepared on the condition set for each frame image of the negative film 16 is displayed on the monitor 104. Also, the image signal processing unit 102 is connected to an image memory 106 for storing image data. The image signal processing unit 102 stores in the image memory 106 the image data of each frame of the negative film 16 read by the scanner 108.

A negative density measuring unit 56 for measuring the image density of each frame of the negative film 16 is provided downstream of the path of the light transmitted through the half mirror 47. The negative density measuring unit 56 includes a scanner 56B having an image sensor or the like, and a negative density measuring device 56A for measuring the image density of each frame of the negative film 16 read by the scanner 56B. The negative density measuring device 56A is connected to a main control section 20.

The main control section 20 for performing the overall control and monitor operation of the printer processor 10 is disposed under the exposure chamber 52 (FIG. 1). This main control section 20 includes a CPU, a RAM, a ROM and an input/output interface not shown. The main control section 20 is connected with the CC filter control section 39, the negative density measuring device 56A, the image signal processing unit 102 and a subsidiary control section 23 described later, and monitors and controls the operation of the component parts thereof.

The exposure system related to the main exposure section was described above. In addition to the main exposure section, this embodiment includes an exposure system for the subsidiary print section 22 for producing an index print on the basis of the image data stored beforehand in the image memory 106.

The subsidiary print section 22 includes an index image exposure light source 26 operated under the control of the light source control section 24. The index image exposure light source 26 in turn includes a light-emitting diode (hereinafter referred to as R-LED) 26A for emitting the red light, a light-emitting diode (hereinafter referred to as G-LED) 26B for emitting the green light, and a light-emitting diode (hereinafter referred to as B-LED) 26C for emitting the blue light. Each diode is arranged in such a manner that the light emitted from G-LED 26B and the light emitted from B-LED 26C have a light axis aligned with the exposure light axis X of the light emitted from R-LED 26A by a dichroic mirror 28.

A liquid crystal panel 31 is provided downstream of the exposure light axis X of the light source 26. A mirror 30 is disposed at a position in the vicinity of the liquid crystal panel 31 where the image is not affected. A source light amount sensor 29 is disposed in the direction of reflection of the light from the mirror 30 for measuring the amount of the light emitted from the light source.

The liquid crystal panel 31 has a multiplicity of liquid crystal elements arranged regularly and is capable of transmitting the light in 256 levels (corresponding to tones) for example, in response to the signal from a liquid crystal panel driver 32 connected thereto.

The liquid crystal panel 31 is connected to the subsidiary control section 23 through the liquid crystal panel driver 32. The subsidiary control section 23 includes a microcomputer having a CPU, a RAM, a ROM and an input/output interface, and is connected with an image memory 106.

The subsidiary control section 23 reads the image data of each frame of the negative film 16 from the image memory 106 and forms an index image data for determining the amount of the light transmitted through the liquid crystal panel 31 on the basis of the image data. An image corresponding to the image data for a predetermined number of, say, five frames (one line), among the index image data formed at a time is output to the liquid crystal panel driver 32 by the subsidiary control section 23 as a signal corresponding to the degree of transmission through each liquid crystal element. As a result, the liquid crystal panel driver 32 controls the degree of transmission of each liquid crystal element in accordance with the signal and thus causes a corresponding image to be displayed on the liquid crystal panel 31.

A mirror 34 is disposed in a position on the emission side of the liquid crystal panel 31 where the image is not affected. A transmission light amount sensor 33 is disposed in the direction of reflection from the mirror 34. The transmission light amount sensor 33 is for measuring the amount of the light transmitted through the liquid crystal panel 31.

Also, an exposure lens 35 with controllable magnification is disposed on the emission side of the liquid crystal panel 31. The exposure lens 35 causes the image transmitted through the liquid crystal panel 31 to be formed on the printing paper 54 at a predetermined magnification.

The subsidiary control section 23 is further connected with the light source control section 24, the source light amount sensor 29 and the transmission light amount sensor 33. The subsidiary control section 23 calculates the proper correction amount of the light amount on the basis of the light amount of each of R, G and B colors measured by the source light amount sensor 29, and causes the light source subsidiary control section 24 to correct the light amount of each component of the light source 26. In similar fashion, the subsidiary control section 23 adjusts the density of the image displayed on the liquid crystal panel 31 by controlling the liquid crystal panel driver 32 in such a manner as to achieve a proper transmitted light amount based on the transmitted light amount measured by the transmission light amount sensor 33.

The image signal processing unit 102 has the reference image signal processing mode for setting the condition of the display density on the monitor 104 as well as the normal mode for displaying an image on the monitor 104.

Figure 3:
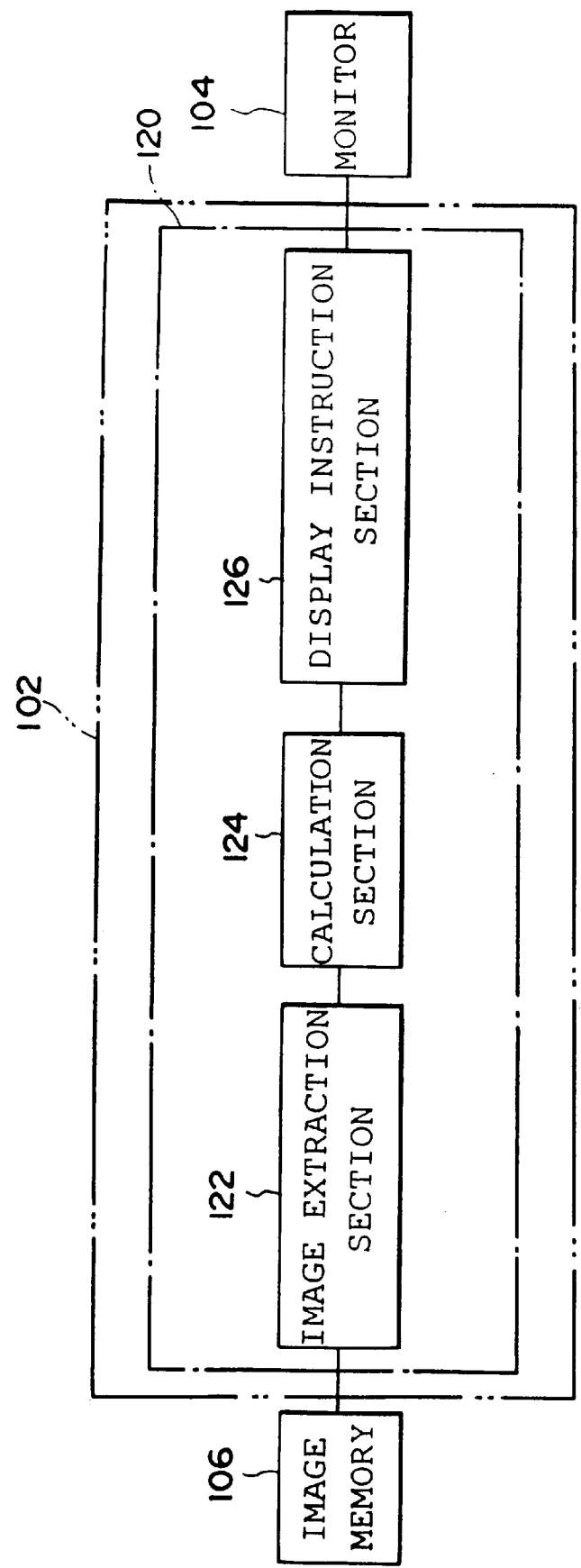
FIG. 3 is a block diagram illustrating a configuration of an image signal processing unit according to a first embodiment.

Now, explanation will be made in detail about the image signal processing unit 102 for executing the reference image signal processing mode with reference to FIG. 3.

The image memory 106 has stored therein a Bull's eye image corresponding to a predetermined density as a reference image for setting the condition of the display density on the monitor 104.

The image signal processing unit 102 includes a simulator adjusting section 120 for supporting the adjustment of the appearance on the monitor 104.

The simulator adjusting section 120 includes an image extraction section 122 connected to the image memory 106. In response to an adjustment instruction for the monitor 104 from the operator, the image extraction section 122 extracts the tone values of R, G and B of a predetermined number of pixels in a predetermined area of the image data stored in the image memory 106.

The image extraction section 122 is connected with a calculation section 124 for calculating the average tone of R, G and B of the pixels extracted by the image extraction section 122.

The calculation section 124 is connected with a display instruction section 126, which in turn is connected with the monitor 104. The display instruction section 126 outputs an instruction signal to display the average tone value of R, G and B calculated by the calculation section 104 at a predetermined position on the monitor 104 in real time. In response to this instruction signal, the average value of R, G and B is quantitatively displayed on the monitor 104.

Now, the operation of the first embodiment will be explained.

In the printer section 58 of the printer processor 10, a negative film 16 having recorded therein an image to be printed is set on a negative carrier 18, and the light is transmitted through the negative film 16 from the light source 38. The density of the image of the negative film formed by the light transmitted through the negative film 16 is measured by the negative density measuring unit 56. In accordance with the image density of the negative film 16 thus measured, the main control section 20 sets the proper exposure condition (such as the amount by which each CC filter 40 is to be inserted). On the basis of the exposure condition thus set, an image of the negative film 16 is printed in a predetermined printing area of the printing paper 54. The printing paper 54 thus printed is conveyed to the processor section 72 where it is developed, fixed and washed. The printing paper 54 thus washed is conveyed to the drying section 80 where it is dried by a high-temperature air. The printing paper 54 thus dried is conveyed to the cutter section 84 and cut into image frames by a cutter not shown thereby to produce a plurality of photographic prints. The photographic prints are delivered to the sorter section 92 where they are sorted appropriately.

In the image exposure process by the subsidiary print section 22, on the other hand, the image of the negative film 16 formed by the light transmitted from the light source 38 is read by the scanner 108, and the image data thus read is stored in the image memory 106 through the image signal processing unit 102. The image data is read from the image memory 106 by the subsidiary control section 23. An image data corresponding to the blue image is displayed on the liquid crystal panel 31 and the B-LED 26C is turned on in such a manner as to form the blue component (hereinafter referred to as the blue image) of the image data on the printing paper 54. As a result, the blue image of the image data is exposed on the printing paper 54. In similar fashion, the red component (red image) and the green component (green image) of the image data are displayed on the liquid crystal panel 31. The image of each component is exposed in overlapped relation on the printing paper 54 by the corresponding light sources 26, respectively. An image to be printed thus is exposed on the printing paper 54.

The image signal processing unit 102 has also the function of aiding the operator in making the adjustment in such a manner that the appearance on the monitor 104 is substantially identical to the actual appearance of the photographic print.

Figure 4:
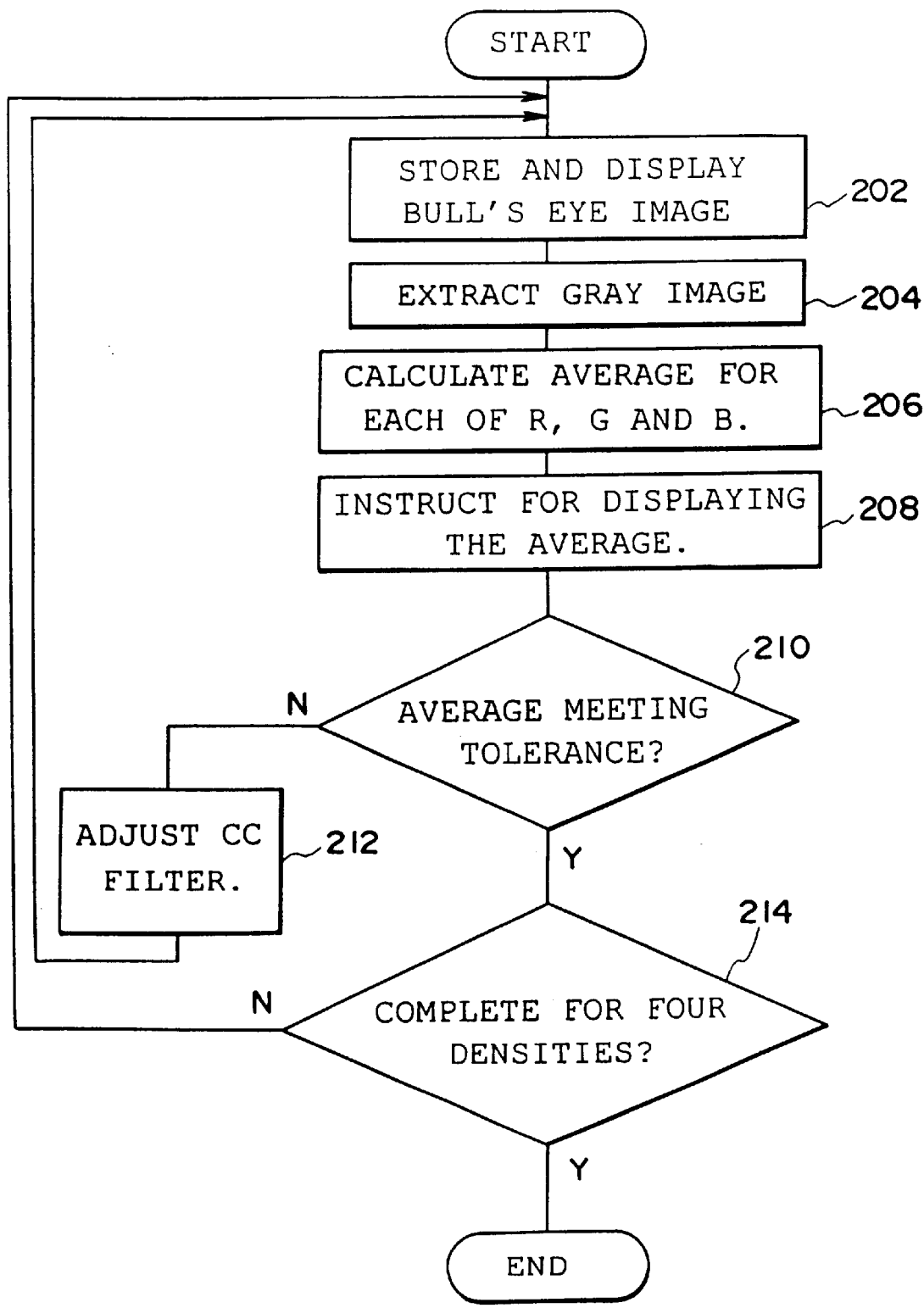
FIG. 4 is a flowchart illustrating a method of adjustment of the appearance on the monitor according to the first embodiment.
Figure 8:
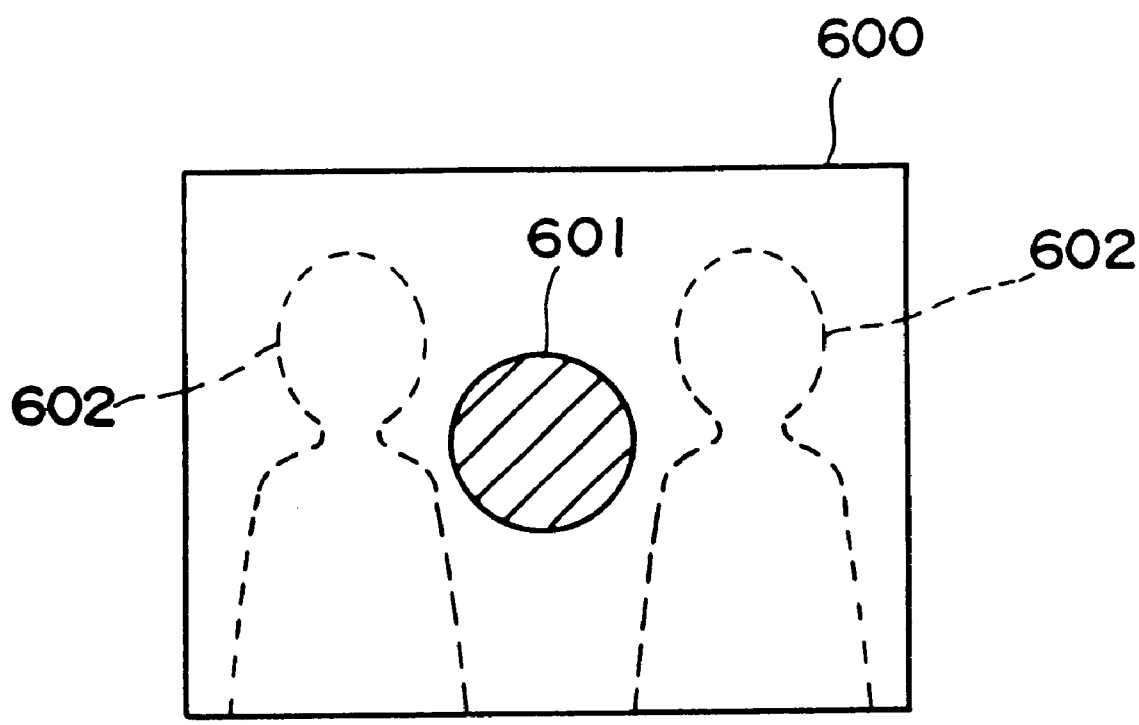
FIG. 8 is a plan view of a Bull's eye.

Now, explanation will be made about a method of adjusting the appearance on the monitor 104 according to the first embodiment with reference to FIG. 4. Assume that four types of Bull's eye including a U Bull's eye, an N Bull's eye, an O Bull's eye and an Oo Bull's eye are prepared in advance as reference images used for adjusting the appearance on the monitor 104. A figure image 602 is recorded in some Bull's eye images as shown in FIG. 8. According to this embodiment, however, only the gray component is required but not any figure image 602.

Uupon instruction from the operator for appearance adjustment on the monitor 104, the image signal processing unit 102 reads a type of image selected by the operator in advance from the four types of Bull's eye images through the scanner 108 in step 202. The image is stored in the image memory 106 and displayed on the monitor 104. According to this embodiment, the U Bull's eye is selected by the operator and set on the negative carrier 18 in advance. This image is therefore stored in the image memory 106 and displayed on the monitor 104.

As soon as the U Bull's eye is stored in the image memory 106 and displayed on the monitor 104, step 204 extracts the tone value of the four (2×2) pixels of R, G and B at substantially the central portion of the gray part existing on the U Bull's eye stored in the image memory 106. The positional coordinate of the gray part of the Bull's eye image to be extracted is assumed to be predetermined.

Upon extraction of the tone values of the four pixels of R, G and B in the gray portion of the U Bull's eye image, step 206 calculates the average tone value of the four pixels for each of R, G and B.

Figure 5:
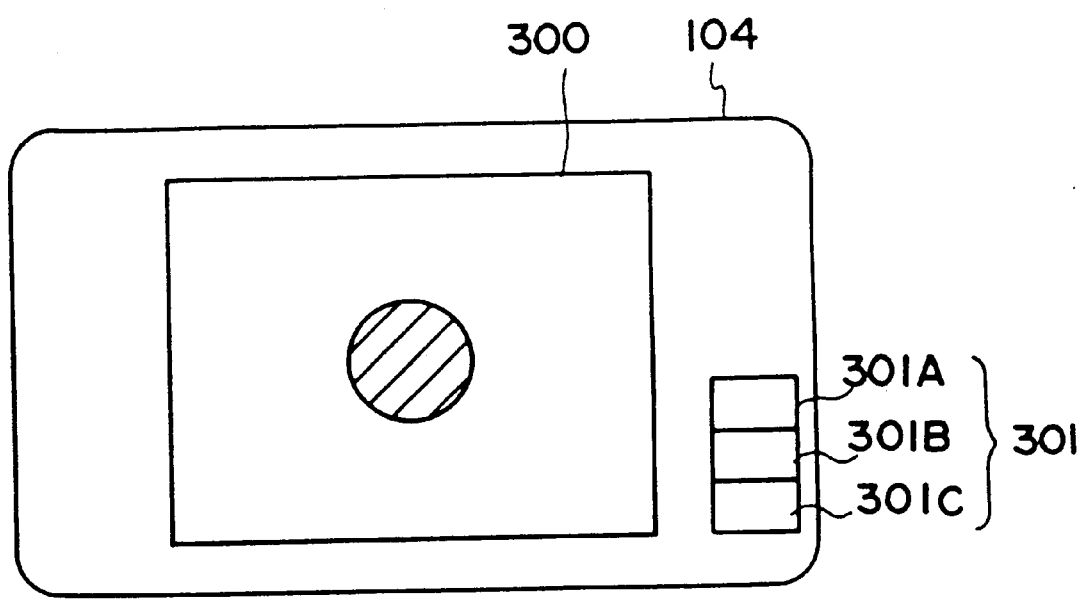
FIG. 5 is a diagram illustrating the display status of the monitor according to the first embodiment.

Upon calculation of the average tone value of the four pixels of R, G and B, step 208 displays the average value in a predetermined position of the monitor 104 in real time. According to this embodiment, as shown in FIG. 5, the Bull's eye negative image 300 is displayed at substantially the central portion of the monitor 104, while the tone average 301A of R, the tone average 301B of G and the tone average 301C of B are displayed, respectively, at the lower right portions on the monitor 104.

The average value 301, when displayed on the monitor 104, is referenced by the operator visually in step 210. The operator decides whether the average values 301A to 301C are included in a predetermined tolerance. The tolerance is set for each of R, G and B as a lower limit and an upper limit of the tone value of the gray image for each Bull's eye corresponding to each negative density. Each tolerance is therefore empirically set as a value which, if met, is considered to realize an image appearance on the monitor 104 substantially equal to the actual print image. Consequently, the smaller the tolerance range, the more the image on the monitor 104 appears identical to the actual print image.

In the case where the decision in step 210 is that any one of the average values 301A to 301C fails to meet the tolerance, the process proceeds to step 212, where the operator changes the amount by which the CC filter 40 is inserted through the main control section 20 and the CC filter control section 39. Then the process is returned to step 202.

In the case where the operator decides that all the average values 301A to 301C meet the tolerance in step 210, on the other hand, the process proceeds to step 214.

In this way, the process of steps 202 to 212 is repeated and the CC filter 40 is adjusted until all the average values 301A to 301C come to meet the tolerance. After complete adjustment, the process proceeds to step 214.

Once the average values 301 all meet the tolerance, step 214 decides whether the adjustment is complete for all the four types of Bull's eye. Under the circumstances, only the adjustment by the U Bull's eye is finished, and therefore the process proceeds to step 202.

Subsequently, the CC filter 40 continues to be adjusted using the N Bull's eye, the O Bull's eye and the Oo Bull's eye sequentially corresponding to various negative film densities.

As described above, the appearance on the monitor 104 can be quantitatively adjusted by the CC filter 40 for the U Bull's eye, the N Bull's eye, the O Bull's eye and the Oo Bull's eye corresponding to the respective negative film densities. As compared with the sensory adjustment by humans, therefore, the variations between different apparatuses are reduced and the adjustment can be performed in a shorter length of time.

The first embodiment was explained with reference to the case in which four (2×2) pixels are extracted from the Bull's eye image. The present invention, however, is not limited to such a case, but may involve 16 (4×4) pixels with equal effect. In this case, the processing time is increased but a more stable average value can be obtained as compared with the case involving four pixels.

Second Embodiment

Figure 6:
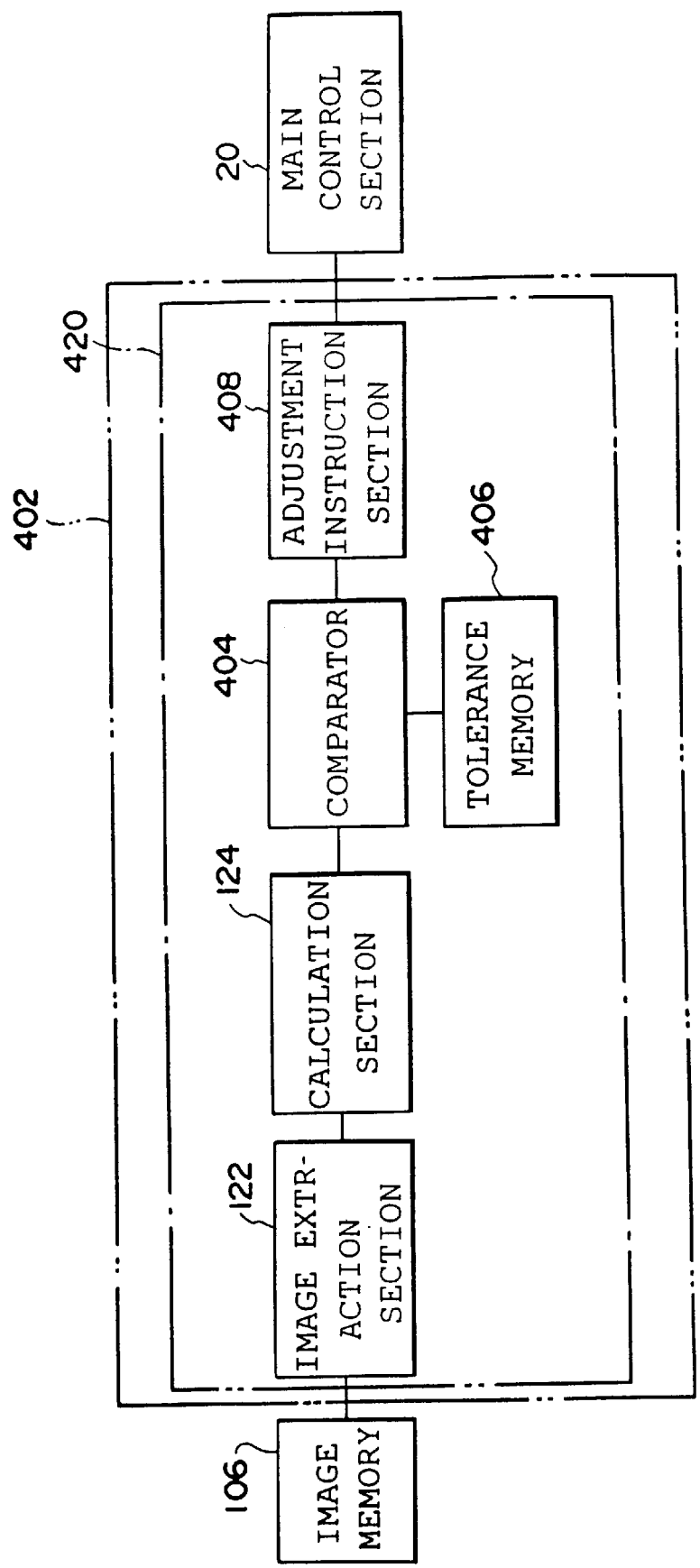
FIG. 6 is a block diagram illustrating a configuration of the image signal processing unit according to a second embodiment.
Figure 7:
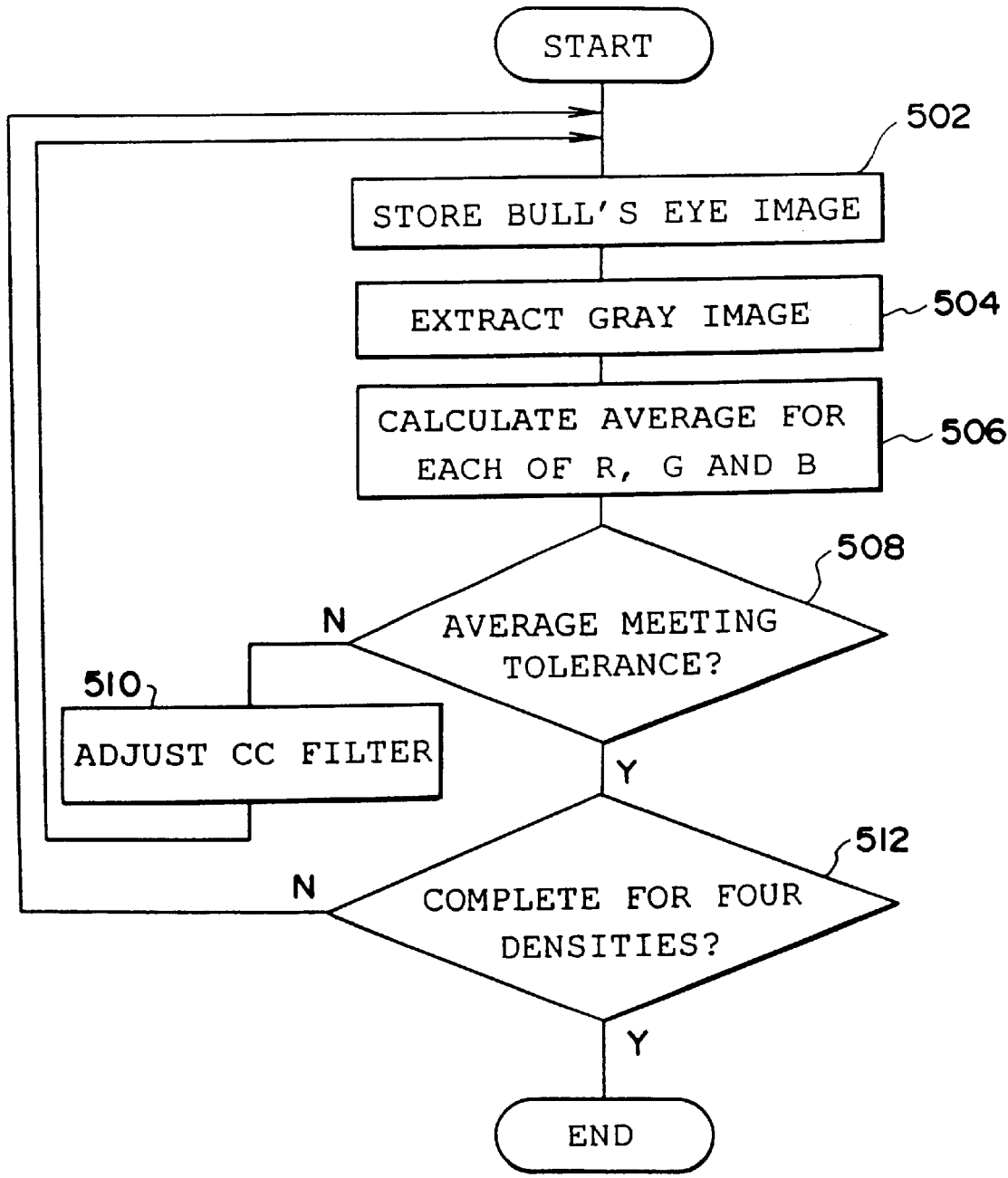
FIG. 7 is a flowchart illustrating a method of adjustment of the appearance on the monitor according to the second embodiment.

FIG. 6 shows the image signal processing unit 402 according to a second embodiment of the present invention.

The image memory 106 has stored therein a Bull's eye image corresponding to a predetermined density as a reference image used for setting the condition of the display density of the monitor 104.

The image signal processing unit 402 includes a simulator adjusting section 420 for adjusting the appearance of the monitor 104 by adjusting the amount of insertion of the CC filter 40. The simulator adjusting section 420 includes an image extraction section 122 and a calculation section 124 having the same functions as the corresponding parts of the first embodiment, respectively.

The calculation section 124 is connected with a comparator 404, which in turn is connected with a tolerance memory 406. The tolerance memory 406 has stored therein the tolerance of the average value calculated by the calculation section 124. The comparator 404 compares the tolerance stored in the tolerance memory 406 with the average value.

The comparator 404 is further connected with an adjustment instruction section 408 for giving an instruction for adjustment of the CC filter 40 on the basis of the result of comparison in the comparator 404.

The adjustment instruction section 408 is connected with the main control section 20. Upon receipt of an adjustment instruction for the CC filter 40 from the adjustment instruction section 408, the main control section 20 adjusts the CC filter 40 through the CC filter control section 39.

Now, the operation of the second embodiment of the present invention will be explained.

In the printer section 58 of the printer processor 10, the negative film 16 having recorded thereon an image to be printed is set in the negative carrier 18, and the light is transmitted through the negative film 16 from the light source 38. The density of the image formed on the negative film 16 by the light transmitted through the negative film 16 is measured by the negative density measuring unit 56. In accordance with the density of the image on the negative film 16 thus measured, the main control section 20 sets a proper exposure condition (such as the insertion amount of each CC filter 40). On the basis of the exposure condition thus set, the image on the negative film 16 is printed in a predetermined printing area of the printing paper 54. The printing paper 54 thus printed is conveyed to the processor section 72 where it is developed, fixed and washed. The printing paper 54 thus washed is conveyed to the drying section 80, where it is dried by a high-temperature air. The printing paper 54 thus dried is transferred to the cutter section 84 and cut into image frames by a cutter not shown. Photographic prints are thus obtained. The photographic prints are delivered to and sorted appropriately in the sorter section 92.

In the image exposure process in the subsidiary print section 22, on the other hand, the image on the negative film 16 transmitted by the light from the light source 38 is read by the scanner 108. The image data thus read is stored in the image memory 106 through the image signal processing unit 402. The subsidiary control section 23 reads the image data from the image memory 106. In such a manner as to form the blue component (hereinafter referred to as the blue image) of the image data on the printing paper 54, an image corresponding to the blue image is displayed on the liquid crystal panel 31 and the B-LED 26C is turned on. As a result, the blue image of the image data is exposed on the printing paper 54. In similar fashion, the red component (red image) and the green component (green image) of the image data are also displayed on the liquid crystal panel 31. The image of each component is exposed in overlapped fashion on the printing paper 54 by the corresponding light source 26, so that the image to be printed is exposed on the printing paper 54.

The image signal processing unit 402 has also the function of adjusting the appearance of the actual photographic print substantially equal to the appearance of the image on the monitor 104.

Now, explanation will be made about a method of adjusting the appearance on the monitor 104 by the image signal processing unit 402 according to the second embodiment. Assume that four types of Bull's eye including the U Bull's eye, the N Bull's eye, the O Bull's eye and the Oo Bull's eye are prepared in advance as reference images used for adjusting the appearance on the monitor 104. Some Bull's eye images, as shown in FIG. 8, have recorded therein a figure image 602. According to the present embodiment, however, only the gray component is required and the figure image 602 is not required.

Upon receipt of an instruction from the operator for adjustment of the appearance on the monitor 104, the image signal processing unit 402 reads one type of image selected from among the four types of Bull's eye images through the scanner 108, and is stored in the image memory 106. According to this embodiment, first, the U Bull's eye image is selected and set on the negative carrier 18. This image is stored in the image memory 106.

When the U Bull's eye image is stored in the image memory 106, step 504 extracts the tone value of the four (2×2) pixels of R, G and B at substantially the central portion of the gray section existing on the U Bull's eye image stored in the image memory 106. In the process, the positional coordinate of the gray section in the Bull's eye image extracted is assumed to be predetermined.

Upon extraction of the tone values of the four pixels of R, G and B of the gray section of the U Bull's eye image, step 506 calculates the average tone value for each of R, G and B of the four pixels.

Upon calculation of the average value for each of R, G and B of the four pixels, step 508 decides whether each average value meets the tolerance set in the tolerance memory 406 in advance. This tolerance is set for each of R, G and B as an upper limit and a lower limit of the tone value of the gray image for each Bull's eye corresponding to each negative density. As far as this limit is met, therefore, the appearance on the monitor 104 is empirically assumed to be substantially the same as that of the image actually printed. As a result, the smaller the tolerance range, the higher the possibility that the image on the monitor 104 is identical in appearance to the image actually printed.

If it is decided in step 508 that any one of the averages for R, G and B fails to meet the tolerance, the process proceeds to step 510. The insertion amount of the CC filter 40 is adjusted through the main control section 20 and the CC filter control section 39, after which the process returns to step 502.

When it is decided that the average values for R, G and B all meet the tolerance the process proceeds to step 512.

The process of steps 502 to 510 is repeated until all the average values meet the tolerance. As a result, the CC filter 40 is automatically adjusted, and after complete adjustment, the process proceeds to step 512.

Once all the average values meet the tolerance, step 512 decides whether the adjustment is complete for all the four types of Bull's eye. At this stage, only the U Bull's eye is completely adjusted, and therefore the process proceeds to step 502.

Subsequently, the CC filter 40 is adjusted sequentially using the N Bull's eye, the O Bull's eye and the Oo Bull's eye corresponding to the respective negative densities.

As a result of the above-mentioned process, it is possible to quantitatively adjust the appearance on the monitor 104 by the adjustment of the CC filter 40 for the U Bull's eye, the N Bull's eye, the O Bull's eye and the Oo Bull's eye corresponding to the respective negative densities. As in the first embodiment, therefore, as compared with the sensory adjustment by a man, the variations between apparatuses are reduced while at the same time shortening the adjustment time.

Also, since the decision can be made automatically as to whether the average value meets the tolerance and the CC filter can be adjusted automatically, the adjustment time can be further reduced as compared with the first embodiment. In this way, misjudgment, operational error, and other human errors are eliminated.

According to the second embodiment, the pixels extracted from the Bull's eye are 4 (2×2) pixels. The present embodiment, however, is not limited to such a case, but as in the first embodiment, is applicable to 16 (4×4) pixels. In this case, as compared with the four-pixel configuration, the processing time is increased while a stable average value is obtained.

Although an explanation was made about the case in which nothing is displayed on the monitor 104 according to the second embodiment, the present invention is not limited to such a case. Instead, Bull's eye images and also the average values of the R, G and B can be displayed on the monitor 104. In the case where a Bull's eye image is displayed, it is possible for the operator to visually reference and check the appearance of the Bull's eye image. Further, in the case where the average value is displayed for each of R, G and B, the operator can decide whether each average value is included in a predetermined range.

It will thus be understood from the foregoing description that according to the invention, there is provided an image printing apparatus and a monitor display density setting method for quantitative adjustment. As compared to the sensory adjustment by human, the variations between apparatuses are reduced while at the same time the adjustment time is shortend.

What is claimed is:

1. An image printing apparatus for exposing an image recorded on a photographic film and printing a predetermined printing area on a photosensitive material, the apparatus comprising:

a simulator for reading said image by a scanner to obtain a digital image data of said image and displaying an image based on said digital image data on a monitor, wherein said simulator has a reference image signal processing mode for reading a reference image by said scanner, extracting a predetermined number of digital pixel data for each color of the gray component from a digital image data of said read reference image quantitatively displaying said digital pixel data on said monitor, and adjusting said digital pixel data displayed on said monitor on a basis of a predetermined tolerance for substantially equalizing an appearance of the image on said monitor and an image to be printed, said digital pixel data being data of pixels located at a predetermined position in the digital image data of said read reference image.

2. An apparatus according to claim 1, wherein a plurality of said digital pixel data are extracted for each color of the gray component from said reference image read by said scanner, and the average value of a plurality of said digital pixel data is displayed on said monitor for each color in said reference image signal processing mode.

3. A method of setting the monitor display density used with an image printing apparatus which exposes an image recorded on a photographic film, quantitatively displays said image on a monitor before printing said image in a predetermined printing area on a photosensitive material, and adjusts said image to be printed, the method comprising the steps of:

reading a reference image by a scanner to obtain a digital image data;

extracting a predetermined number of digital pixel data for each color of the gray component from said digital image data; and on the basis of a predetermined number of said extracted digital pixel data for each color of the gray component, adjusting said digital pixel data on said monitor on a basis of a predetermined tolerance for substantially equalizing an appearance of the image on the monitor and an image to be printed, said digital pixel data being data of pixels located on a predetermined position in the digital image data of said read reference image.

4. A method according to claim 3, wherein the digital image data of a reference image read by said scanner is displayed on said monitor.

5. A method according to claim 3, wherein a predetermined number of said extracted digital pixel data for each color of the gray component are displayed on said monitor.

6. A method according to claim 4, wherein a predetermined number of said extracted digital pixel data for each color of the gray component are displayed on said monitor.

7. An image printing apparatus for exposing an image recorded on a photographic film and printing a predetermined printing area on a photosensitive material, the apparatus comprising:

a simulator for reading said image by a scanner to obtain a digital image data of said image and displaying an image based on said digital image data on a monitor, wherein said simulator has a reference image signal processing mode for reading a reference image by said scanner, extracting a predetermined number of digital pixel data for each color of the gray component from a digital image data of said read reference image and displaying said digital pixel data on said monitor, said digital pixel data being data of pixel located on a predetermined position in the digital image data of said read reference image.

* * * * *